US007437662B1

(12) United States Patent
Yu et al.

(10) Patent No.: US 7,437,662 B1
(45) Date of Patent: Oct. 14, 2008

(54) REPRESENTING DELTAS BETWEEN XML VERSIONS USING XSLT

(75) Inventors: Tim Yu, Cupertino, CA (US); Megnha Mehta, Foster City, CA (US); Benjamin Chang, Atherton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 744 days.

(21) Appl. No.: 10/173,470

(22) Filed: Jun. 14, 2002

Related U.S. Application Data

(60) Provisional application No. 60/384,693, filed on May 31, 2002, provisional application No. 60/298,437, filed on Jun. 15, 2001.

(51) Int. Cl.
*G06F 17/00* (2006.01)
(52) U.S. Cl. .................. 715/229; 715/234; 715/236; 707/1; 707/100; 711/118
(58) Field of Classification Search ............... 715/511, 715/513, 229, 234, 236; 707/200, 203
See application file for complete search history.

(56) References Cited

U.S. PATENT DOCUMENTS

| 6,108,698 | A | 8/2000 | Tenev et al. | |
|---|---|---|---|---|
| 6,449,624 | B1 * | 9/2002 | Hammack et al. | 707/203 |
| 6,502,112 | B1 * | 12/2002 | Baisley | 715/513 |
| 6,584,458 | B1 | 6/2003 | Millett et al. | |
| 6,585,778 | B1 * | 7/2003 | Hind et al. | 715/513 |
| 6,643,668 | B2 * | 11/2003 | Sluiman | 707/200 |
| 6,654,761 | B2 | 11/2003 | Tenev et al. | |
| 6,662,342 | B1 | 12/2003 | Marcy | |
| 6,801,224 | B1 | 10/2004 | Lewallen | |
| 6,804,677 | B2 | 10/2004 | Shadmon et al. | |
| 6,848,078 | B1 * | 1/2005 | Birsan et al. | 715/511 |
| 2002/0091533 | A1 * | 7/2002 | Ims et al. | 705/1 |
| 2003/0046317 | A1 * | 3/2003 | Cseri et al. | 707/513 |

OTHER PUBLICATIONS

"Unix On-Line Man Pages", User Command diff(1) option -e on p. 3, http://bama.ua.edu/cgi-bin/man-cgi, 6 pages, SunOS 5.9, last change May 1, 2002.

* cited by examiner

*Primary Examiner*—Rachna Singh
*Assistant Examiner*—Quoc A Tran
(74) *Attorney, Agent, or Firm*—Hickman Palermo Truong & Becker LLP

(57) ABSTRACT

Approaches are described herein to represent a delta using the extensible style language transformation language (XSLT) to describe the delta between versions of a data entity. XSLT is a language that defines operations for transforming a body of data ("source") that conforms to the extended mark-up language (XML) into a different body of data ("target") typically in another format, such as HTML. A set of XML instructions represents a delta by specifying operations needed to transform or change a source version of an XML entity into a target version of an XML entity.

18 Claims, 7 Drawing Sheets

```
                <?xml version="1.0"?>
210 ———        <booklist>
220 ——           <book>
                   <title>Twelve Red Herrings</title>
                   <author>Jeffrey Archer</author>
                   <publisher>Harper Collins</publisher>
                   <price>7.99</price>
                 </book>
230 ————         <book>
                   <title>The Eleventh Commandment</title>
                   <author>Jeffrey Archer</author>
                   <publisher>McGraw Hill</publisher>
                   <price>3.99</price>
                 </book>
240 ——           <book>
                   <title>C++ Primer</title>
                   <author>Lippmann</author>
                   <publisher>Harper Collins</publisher>
                   <price>4.99</price>
                 </book>
250 ——           <book>
                   <title>Emperor's New Mind</title>
                   <author>Roger Penrose</author>
                   <publisher>Oxford Publishing Company</publisher>
                   <price>15.9</price>
                 </book>
260 ——           <book>
                   <title>Evening News</title>
                   <author>Arthur Hailey</author>
                   <publisher>MaMillan Publishers</publisher>
                   <price>9.99</price>
                 </book>
               </booklist>
```

FIG. 2

```
                <?xml version="1.0"?>
310             <booklist>
320               <book>
                    <title>Twelve Red Herrings</title>
                    <publisher>Harper Collins</publisher>
                    <author>Jeffrey Archer</author>
                    <price>7.99</price>
                  </book>
340               <book>
                    <title>C++ Primer</title>
                    <author>Lippmann</author>
                    <publisher>Harper Collins</publisher>
                    <price>4.99</price>
                  </book>
350               <book>
                    <title>Emperor's New Mind</title>
                    <author>Roger Penrose</author>
                    <publisher>Oxford Publishing Company</publisher>
                    <price>15.99</price>
                  </book>
370               <book>
                    <title>C Programming Language</title>
                    <author>Kernighan & Ritchie</author>
                    <publisher>EEE</publisher>
                    <price>12.95</price>
                  </book>
360               <book>
                    <title>Evening News</title>
                    <author>Arthur Hailey</author>
                    <publisher>MaMillan Publishers</publisher>
                    <price>9.99</price>
                  </book>
                </booklist>
```

FIG. 3

```
410 ─┐    <!--Select all nodes-->
       <xsl:template match="node()|@*">
   ┌ <xsl:copy>
412 ┤  <xsl:apply-templates select="node()|@*"/>
   │ </xsl:copy>
414 └ </xsl:template>

420 ─── <!-- Move Insert -->
       <xsl:template match="/booklist[1]/book[1]/title[1]">
   ┌ <xsl:copy>
422 ┤  <xsl:apply-templates select="node()|@*"/>
   └ </xsl:copy>
423 ┤ <xsl:element name="{name(/booklist[1]/book[1]/publisher[1])}">
   └ <xsl:value-of select="/booklist[1]/book[1]/publisher[1]"/>
       </xsl:element>
       </xsl:template>

430 ─── <!-- Move Delete -->
       <xsl:template match="/booklist[1]/book[1]/publisher[1]">
       </xsl:template>

440 ─── <!-- Delete -->
       <xsl:template match="/booklist[1]/book[2]">
       </xsl:template>

450 ─── <!-- Modify -->
       <xsl:template match="/booklist[1]/book[4]/price[1]">
452 ─── <xsl:element name = "{name()}">15.99</xsl:element>
       </xsl:template>

460 ─── <!-- Insert -->
       <xsl:template match="/booklist[1]/book[4]">
       <xsl:copy>
       <xsl:apply-templates select="node()|@*"/>
       </xsl:copy>
   ┌ <book>
   │ <title>C Programming Language</title>
   │ <author>Kernighan & Ritchie</author>
466 ┤ <publisher>EEE</publisher>
   │ <price>12.95</price>
   │ </book>
   └ </xsl:template></xsl:stylesheet>
```

FIG. 4

Create templates that cause a target XML version to reflect a difference.

Determine matching attribute for XSLT template (e.g. a path for the source XML version) — 510

Generate XSLT instructions for the template that cause the changes in target node tree that are needed to reflect the difference. — 530

END

FIG. 5

REPRESENTING DELTAS BETWEEN XML VERSIONS USING XSLT

RELATED APPLICATION

This patent application claims priority from U.S. Provisional Patent Application No. 60/298,437, entitled "MANAGING XML IN A DATABASE", filed by Mark J. Barrenechea, on Jun. 15, 2001, the contents of which are herein incorporated by reference in its entirety; the patent also claims priority from U.S. Provisional Patent Application No. 60/384,693, entitled "REPRESENTING DELTAS BETWEEN VERSIONS USING XSLT", filed by Tim Yu, et al. on May 31, 2002, the contents of which are herein incorporated by reference in its entirety.

FIELD OF THE INVENTION

The present invention relates to representing differences between versions of a body of data, and in particular, between versions of an XML entity.

BACKGROUND OF THE INVENTION

Successful software products persist, evolving into multiple versions, each of which may incorporate improvements over previous versions. Managing the development of software is an enormously complex undertaking, especially for evolving software. The practice of managing the evolution of software is referred to as source configuration management.

An important function of source configuration management is versioning. Versioning refers to the creating and tracking of versions of software components (e.g. source code files) in a particular software product. Versioning tools are software tools that provide or facilitate versioning. Versioning tools track versions of a software component, and provide information about differences between versions. Differences between versions of a data entity, such as software components, files, and text documents, or a portion thereof, are referred to herein as a delta.

Initial versioning tools stored a complete copy of each version of a software component. Information about the delta between particular versions was generated by comparing the complete copy of the versions.

Later versioning tools stored information describing only deltas between versions. Data representing the delta between particular versions is referred to herein as a delta representation. Storing delta representations requires less storage than storing complete copies of versions because, between consecutive versions of a software component, the complete delta comprises only a small percentage of the software component.

Most delta based versioning tools are developed by proprietary software vendors. A proprietary software vendor may use proprietary formats to format data generated by the vendor's versioning tools, including a proprietary format for representing deltas. Typically, a proprietary format is protected and/or not made public. This prevents other software vendors from developing tools that can process data generated by another vendor's versioning tool. Thus, versioning tools developed by one software vendor cannot be used to process data generated by another vendor's versioning tools. The user of a versioning tool thus is limited to one vendor.

Furthermore, a user (e.g. software development company) of a "legacy" versioning tool may wish to switch to another versioning tool. To do this, the proprietary formatted data ("legacy data") of the legacy versioning tool must be converted to the format of the new versioning tool. The process of converting the format of data is inherently expensive, not only in terms of the resources expended to carry out the conversion, but also in terms of the interruption to the business operations of the user. Because the vendor of the legacy tool is the only one that may know about or is entitled to use the proprietary format of the legacy data, only that vendor can provide the capability to convert the legacy data. This gives a virtual monopoly to the vendor, with a bargaining power that is often exploited by the vendor.

Based on the foregoing, it is clearly desirable to provide an approach that uses non-proprietary formats for representing data generated by versioning tools, and in particular, for delta representations.

SUMMARY OF THE INVENTION

Approaches are described herein to represent a delta using the extensible style language transformation language (XSLT) to describe the delta between versions of a data entity. XSLT is a language that defines operations for transforming a body of data ("source") that conforms to the extended mark-up language (XML) into a different body of data ("target") typically in another format, such as HTML. According to an approach, a set of XML instructions represents a delta by specifying operations needed to transform or change a source version of an XML entity into a target version of an XML entity.

An advantage of representing deltas using XSLT is that the deltas are represented using an open, non-proprietary, and established standard. In general, information about the standard is openly available to all software developers, and provides a common, popular, and extensively supported format to represent the deltas. In fact, many widely available XSLT processors may be used to transform a source version of an XML entity into a target version of the XML entity.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 depicts in detail XML code of a version of an XML entity according to an embodiment of the present invention.

FIG. 3 depicts in detail XML code of another version of an XML entity according to an embodiment of the present invention.

FIG. 4 depicts in detail XSLT instructions of an XSLT delta representation according to an embodiment of the present invention.

FIG. 5 is a flowchart depicting a process for generating XSLT templates for an XSLT delta representation according to an embodiment of the present invention.

DETAILED DESCRIPTION OF THE INVENTION

Figure 1:
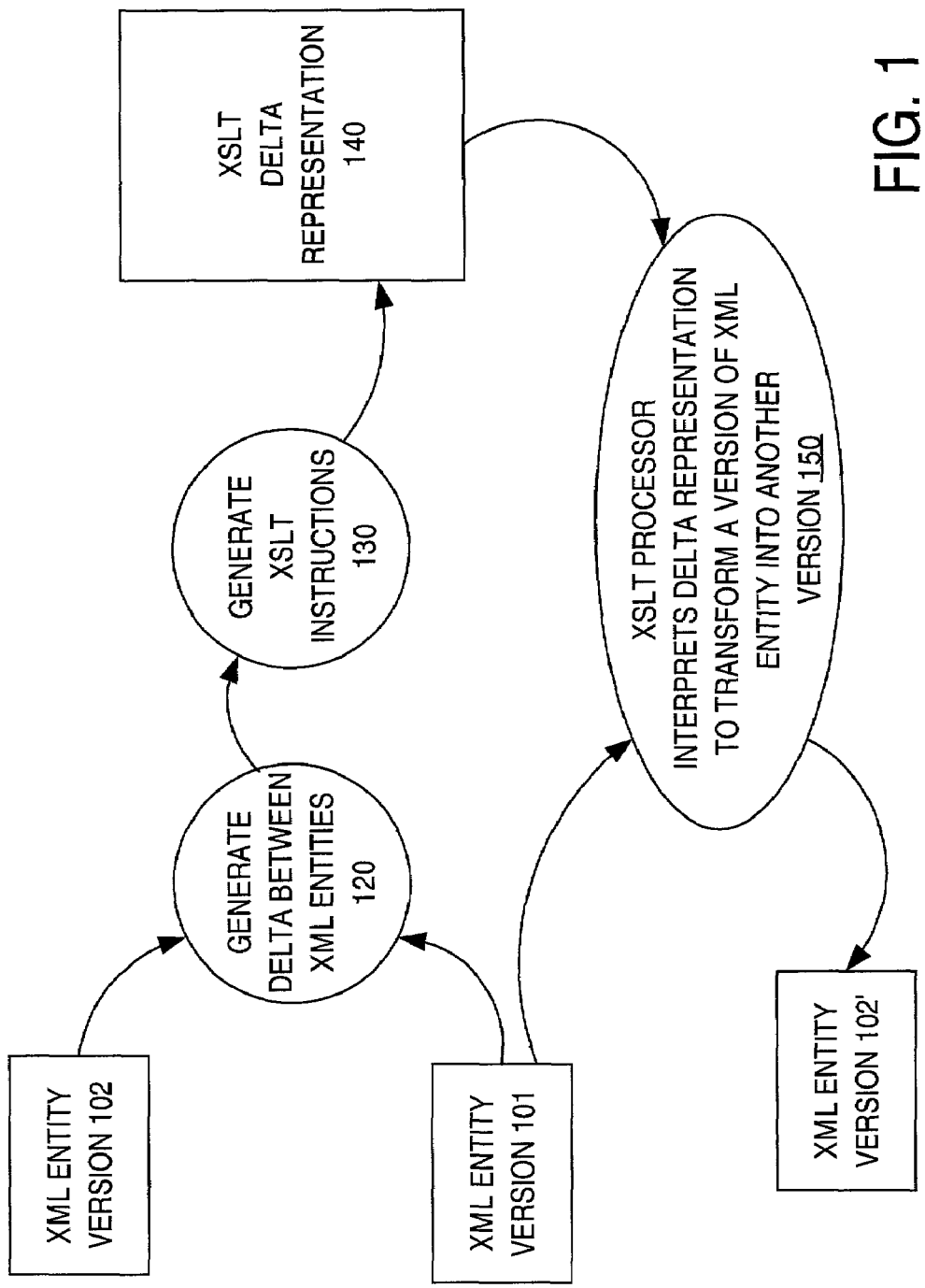
FIG. 1 is a flow diagram providing an architectural overview of an embodiment of the present invention.

A method and apparatus for representing the deltas between versions of a data entity are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

XML Technology

Because the present invention is based on XML related technology, a description of XML is useful. XML is rapidly becoming the common standard for representing data. XML describes and provides structure to a body of data, such as a file or data packet, referred to herein as an XML entity. The XML standard provides for tags that delimit the sections of an XML entity referred to as XML elements. Each XML element may contain one or more name-value pairs referred to as attributes. The following XML Segment A is provided to illustrate XML.

Segment A

```
<book>
<title>XML Programming</title>
<publication publisher="Doubleday"
    date="January"></publication>
<Authors>
    <Author>Mark Berry</Author>
    <Author>Mary Bay</Author>
</Authors>
</book>
```

XML elements are delimited by a start tag and a corresponding end tag. For example, segment A contains the start tag <title> and the end tag </title> to delimit an element. The data between the elements is referred to as the elements content. In the case of this element, the content of the element is the text value 'XML Programming'.

Element content may contain various other types of data, which include attributes and other elements. Attributes of an element are represented by attribute name-value pairs. An attribute name-value pair specifies the attribute's name and value. For example, the element delimited by start and end tags <publication> and </publication> contains the attribute name-value pair publisher="Doubleday", specifying an attribute name of publisher and an attribute value of the literal string "Doubleday". An element is herein referred to by its start tag. For example, the element delimited by the start and end tags <publication> and </publication> is referred to as the publication element.

The book element is an example of an element that contains one or more other elements. Book contains the element publication and authors. An element that is contained by another element is referred to as a descendant of that element. Thus, the publication and authors elements are descendents of the element book. The book element is an ascendant of the elements publication and author. Elements that are direct descendents of the same element are sibling elements. The siblings of title shown in segment A are publication and authors, exclusively.

Authors contains a pair of "iterative elements" defined by the multiple tags named author. They are referred to as iterative elements because they are sibling elements defined by tags of the same name. To facilitate reference to elements, a particular element may be referred to by the following notation element-name[n], where n refers to the order of the element among its sibling elements that are defined by the same tag of the same name, if any. For example, Author[1] refers to the first iterated element author within authors.

A path is a sequence of hierarchically related elements, where each element in the sequence is preceded by its ascendants, if any. A path identifies a particular element. For example, the path string "/book/Authors/Author[ ]" identifies the first iterated element author.

By defining an element that contains attributes and descendant elements, the XML entity defines a hierarchical tree relationship between the element, its descendant elements, and its attribute. A set of elements that have such a hierarchical tree relationship is referred to herein as an XML tree.

Industry standards define structures for XML trees. One such standard is the Document Object Model (DOM), promulgated by the W3C. An XML tree that conforms to the DOM standard is herein referred to as a DOM tree.

In order for a computer to operate on an XML tree, an in-memory representation of the XML tree is generated. In general, an XML tree is read from a storage device (a disk that stores files that contain XML entities) to create in-memory data structures used to represent an XML tree. The in-memory data structures are manipulated by applications running on the computer. Typically, the applications access and manipulate the data structures through a set of routines or functions designed for this purpose.

Typically, an XML tree is represented in memory as a node tree, which is a set of hierarchically related linked nodes. A node in the node tree represents, for example, an element, an element's value, or an attribute of the element. Links between a node and another node represent a hierarchal tree relationship between the nodes, their corresponding elements, attributes, and value. For example, a node corresponding to a parent element node may be linked to nodes representing child elements of the parent element, and linked to nodes representing attributes of the parent element.

Overview

FIG. 1 is a flow diagram providing an architectural overview of an embodiment of the present invention. Referring to FIG. 1, its shows XSLT delta representation 140. An XSLT delta representation, such as XSLT delta representation 140, is a body of instructions that represents the delta between a base XML entity and a target XML entity. Instructions in an XSLT delta representation are applied to a source XML entity to produce a copy of the target XML entity. XSLT delta representation 140 represents the delta between target XML entity version 102 and source XML entity version 101. An XSLT delta representation 140 may be one or more XSLT instructions stored in one or more files or other types of data containers.

Process 120 is representative of operations that are performed to determine the delta between target XML entity version 102 and source XML entity version 101. The delta may be determined by generating a node tree representation of XML entity versions 102 and 101, and comparing the node tree representations to determine the delta.

Process 130 is representative of operations performed to generate, based on the differences determined by process 120, XSLT instructions that represent differences between XML entity versions 102 and 101. The instructions generated by process 130 are stored as XSLT delta representation 140.

Process 150 represents operations performed by an XSLT processor to interpret XSLT delta representation 140. An XSLT processor is a software component configured to execute XSLT instructions. Interpretation of XSLT delta representation 140 causes the XSLT processor to transform source XML entity version 101 to generate a copy of a target XML entity version 102, XML entity version 102'.

XML entity version 102 and 102' may not be exact replica's of each other in that white space in XML entity version 102 may not be present in XML entity version 102'. White space refers to punctuation and formatting characters in an XML entity that are not preserved by an XSLT processor during parsing of the XML entity. White space includes, for example, carriage returns, tabs and space characters between attribute name-value pairs. In an embodiment, comments are not treated as white space (i.e. text contained in an element having the format <!-- comment text -->).

Source XML entity version 101, target XML entity version 102, and XSLT delta representation 140 are represented in greater detail in FIGS. 2, 3, and 4, respectively.

Referring to FIG. 2, it shows node booklist 210 within source XML entity version 101. Booklist 210 contains iterated book elements 220, 230, 240, 250, and 260. Each of the elements contain the elements title, author, publisher, and price.

Referring to FIG. 3, it shows element booklist 310, a version of element booklist 210. Element booklist 310 contains iterated book elements 320, 340, 350, 360, and 370. Most of these elements are copies or modified versions of the iterated book elements in booklist 210. Elements 340 and 360 are copies of elements 240 and 260. Element 320 is a modified version of element 220 having the following differences: the relative positions of the publisher and author elements within element 320 have been switched. Element 350 is a modified version of element 250. The text value of the element price in element 350 reflects a change in value from "15.9" to "15.99".

In addition, element 230 has been deleted from booklist 310. Element 370 has been inserted into booklist 310.

FIG. 4 shows XSLT instructions within XSLT delta representation 140. XSLT is a declarative language, meaning it specifies how results should look like. XSLT processors operate on in-memory node tree representations of XML entities. XSLT instructions specify how those nodes should be reflected in the result, referred to herein as a target node tree.

In the following description of FIGS. 2 and 3, elements of target XML entity version 102 and source XML entity version 101 may be referred to as nodes. The reason these elements are referred to as nodes is that target XML entity version 102 and source XML entity version 101 are used to illustrate how an XSLT processor applies the XSLT instructions to an in-memory node tree representation of these XML entities. Referring to the elements as nodes allows operations of the XSLT processor to be more conveniently and concisely expressed.

XSLT delta representation 140 contains multiple XSLT templates, each XSLT template specifying how one or more nodes should appear in a target "node tree". An XSLT template may include a match attribute, which identifies which one or more nodes in a "source" node tree the XSLT template is to be applied to. As mentioned before, a node tree represents elements and their element attributes as nodes. Thus, when an XSLT template identifies a node, it may be identifying a node that corresponds to an element or an element attribute. Nodes in a node tree are herein referred by their corresponding element.

XSLT constructs conform to XML. Each XSLT template is an element; the instructions in the XSLT template are also elements. For example, XSLT template 420 is an element having a beginning tag <xsl:template match="node ( )|@"> and ending tag </xsl:template>. The matching attribute identifies the node title within element 220.

The following is a description of how an XSLT processor executes the XSLT templates in XSLT delta representation 140. Further details about the syntax of XSLT and the operations they specify, and how XSLT processors execute them may be found in *XSL Transformations (XSLT) Version* 1.0, W3C Recommendation, 16 Nov. 1999, and *XSL Transformations (XSLT) Version* 1.1, W3C Working Draft, 24 Aug. 2001. The present invention is not limited to any particular version of XSLT, version of XML, or any other version of any other computer language.

In the following description, XSLT instructions are referred to as performing actions, such as copying a node. However, this is just a convenient way of expressing that an XSLT processor or some other executing entity is performing these actions in response to executing the instructions. For example, the statement an "instruction copies a node" is just a convenient way of expressing that execution by an XSLT processor of the instruction causes the XSLT processor to copy the node.

Furthermore, operations performed by the XSLT processor are described as being performed on a node in a source tree or as being performed on a corresponding element or attribute. However, this is just a convenient way of expressing how those operations affect the target source tree and the XML entity represented by the target source tree. For example, the statement that "a node's value is modified" is just a convenient way of expressing that the value of a corresponding version of the node in the target node tree is made to be different. The statement that an "element is deleted" is just a convenient way of expressing that no corresponding node is created in the target node tree.

Referring to FIG. 4, in XSLT template 410, the match attribute identifies all nodes in the source node tree. XSLT instructions 412 copies all nodes that satisfy the matching attribute, except for nodes that match another XSLT template in XSLT delta representation 140.

XSLT templates 420 and 430 operate in tandem to "move" publisher from below author within element 220 to above the author in element 320. XSLT template 420 inserts publisher into element 320 above author, and XSLT template 430 deletes the element from below author.

XSLT template 420 specifies an insertion operation by (1) specifying a "placeholder" node, which is a node which fixes a place within a node tree to insert one or more other nodes, (2) specifying instructions for copying the placeholder node, and (3) specifying instructions for inserting nodes. Here, the placeholder node is title within element 220.

The matching criteria of XSLT template 420 identifies element 220 by specifying the path "/booklist[1]/book[ ]/title [1]". Thus, XSLT template 420 is applied to the node for the element 220. Instructions 422 in XSLT template 420 copy title into target XML entity version 102. Instructions 423 insert the publisher after element title just copied into element 320.

With respect to XSLT template 430, its matching criteria specifies the path "/booklist[1]/book[1]/publisher[1]", which identifies publisher in element 230. XSLT template 430 specifies no action, deleting the element in effect by not specifying that anything is to be changed in the target node tree.

XSLT template 440 deletes element 230 from XSLT delta representation 140. The matching criteria of XSLT template 440 specifies the path "/booklist[1]/book[1]/publisher[1]", which identifies element 230. XSLT template 440 specifies no action, deleting the element 220 by not specifying that anything is to be changed in the node tree.

XSLT template 450 modifies the value of the price in element 250. The element is identified by the match attribute of XSLT template 450, which specifies path "/booklist[1]/book[4]/price[1]". Element 452 sets the value of the price element in element 350 to "15.99".

XSLT template 460 inserts element 370 into target XML entity version 102. The matching attribute of element 360 identifies element 250, a place holder node. Instructions 466 add nodes after the place holder node.

Creating Instructions

FIG. 5 shows steps that may be used to create XSLT templates that represent one or more differences of a delta. The process is executed for one or more differences identified by process 150. Such differences include deletion of nodes, insertion of nodes, modification of nodes, and movement of nodes (which may be represented by a deletion and an insertion).

Referring to FIG. 5, at step 510, the value of the matching attribute of the XSLT template is generated, the value typically being a path string. The path generated depends on the type of difference being processed at this step. FIG. 4 provides examples of the type of path generated to reflect a particular type of difference in the target node tree. For example, if a node in the source tree is being deleted, then the path identifies the node to delete.

If the difference involves an insertion of nodes, then the path identifies a placeholder node. A placeholder node may be an adjacent sibling node or a placeholder node.

A set of multiple differences may be based on the same placeholder node. In such cases, one XSLT template may be generated for the complete set of differences.

For some differences, more than one XSLT template is generated. In this case, a match attribute value is generated for each XSLT template. An example of when multiple XSLT templates are generated is the XSLT templates generated to move a node. As was illustrated by XSLT templates 420 and 430, two XSLT templates are generated to move a node, one to insert the node at a new location, another to delete the node from its former location.

At step 530, XSLT instructions are generated for the XSLT template that cause the changes in target node tree that are needed to reflect the difference. The particular instructions generated depend on the type of difference being processed, as illustrated by FIG. 4.

Generating Multiple Representations

For purposes of illustration, FIG. 1 depicts only one XSLT delta representation for one version of a data entity. However, the present invention is of course not so limited. As mentioned earlier, it is advantageous for a versioning system to represent and track multiple versions of an XML entity by maintaining any XSLT delta representations that represent deltas between versions.

In such a versioning system, a data entity and its various versions would be represented by a base version, which is a complete copy of the data entity, and one or more deltas for unmaterialized versions. An unmaterialized version is a version for which there is no copy that is necessarily persistently stored. Each unmaterialized version is associated with a delta representation representing the delta between the unmaterialized version and another version.

Figure 6:
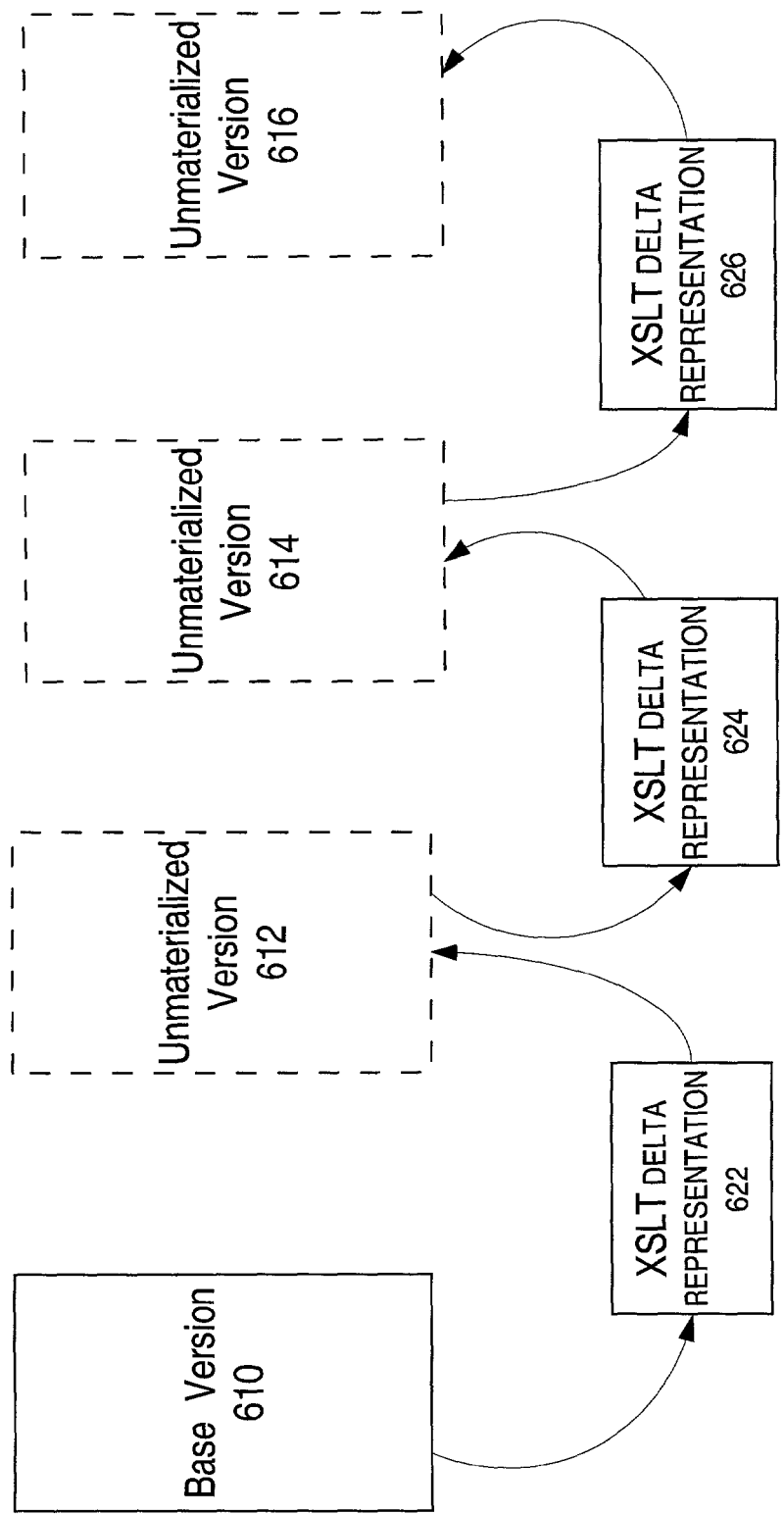
FIG. 6 is a diagram depicting multiple delta representations used to generate multiple versions of a data entity according to an embodiment of the present invention.

FIG. 6 depicts an example of a base version and multiple delta representations for unmaterialized versions of the base version that are stored in a versioning system. Referring to FIG. 6, it shows base version 610, and subsequent unmaterialized versions 612, 614, and 616. Because unmaterialized versions 612, 614, and 616 are unmaterialized, complete copies of them are not actually maintained in the versioning system. Instead, a delta representation is stored for each of them. XSLT delta representation 622 represents the delta between base version 610 and unmaterialized version 612, XSLT delta representation 624 represents the delta between unmaterialized version 612 and unmaterialized version 614, XSLT delta representation 626 represents the delta between unmaterialized version 614 and unmaterialized version 616.

An unmaterialized version that is not a base version may have zero or more predecessor versions between it and a base version. Each of the predecessor versions are associated with an XSLT delta representation. To generate a complete copy of the version, the XSLT delta representation of the predecessors are cumulatively applied to the base version. For example, to generate a complete copy of unmaterialized version 616, XSLT delta representation 622 is applied to base version 610 to generate a copy of unmaterialized version 612. XSLT delta representation 624 is then applied to the copy of unmaterialized version 612 to generate a copy of unmaterialized version 614. XSLT delta representation 626 is applied to the copy of unmaterialized version 614 to generate a copy of unmaterialized version 616.

Hardware Overview

Figure 7:
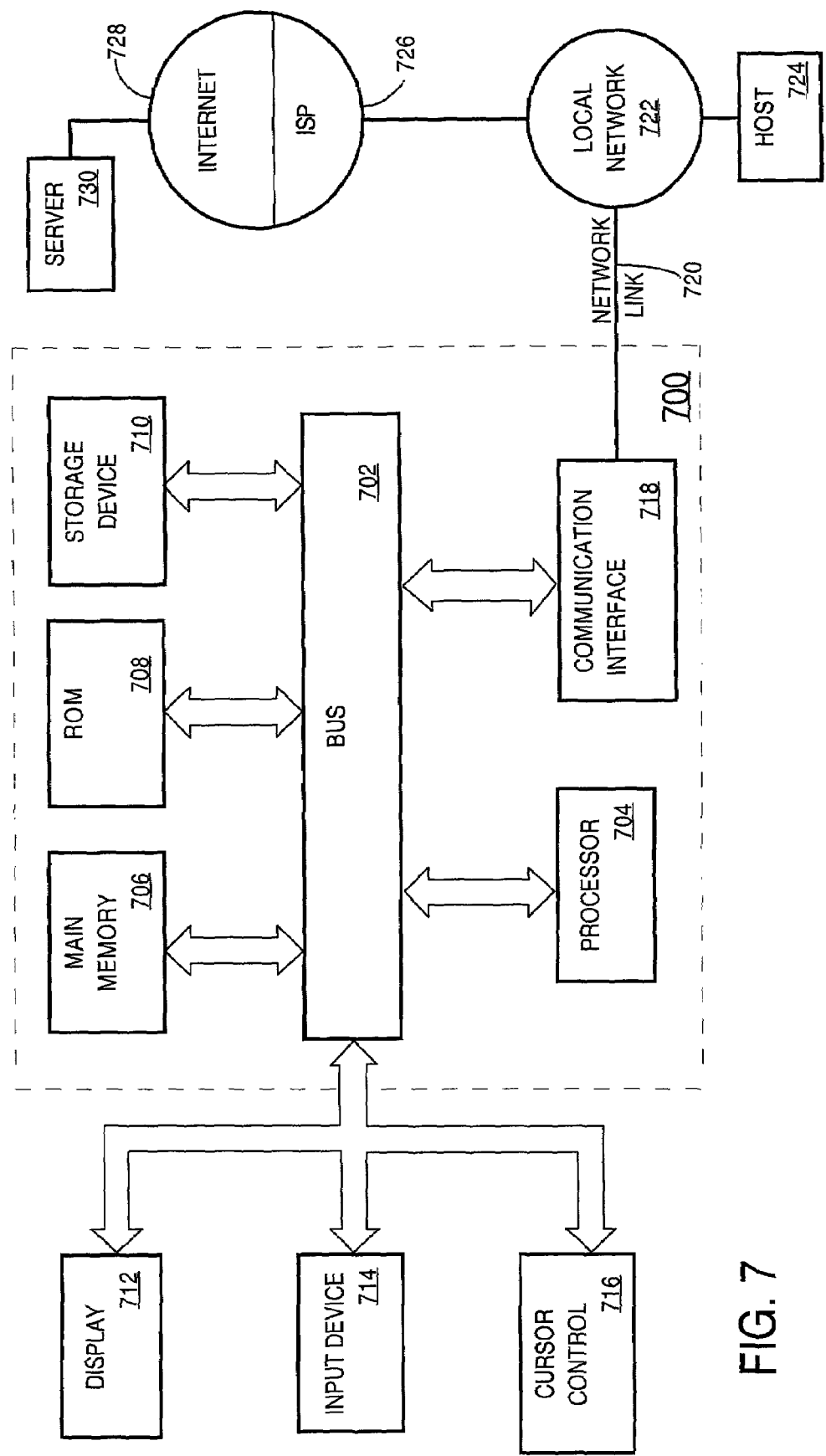
FIG. 7 is computer system that may be used to implement an embodiment of the present invention.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of representing versions of data entities, the method comprising the computer-implemented steps of:
    performing a determination of a delta between a first data entity that conforms to an extensible mark-up language and a second data entity that conforms to the extensible mark-up language;
    generating based on said determination a body of instructions that prescribes operations for transforming said first data entity into said second data entity;
    wherein said body of instructions represents the delta between said first data entity and said second data entity;
    wherein the body of instructions conforms to an extensible style language transformation language;
    wherein the delta reflects one or more changes that have been made to said first data entity to obtain said second data entity;
    creating an unmaterialized version of said second data entity, wherein creating the unmaterialized version comprises persistently storing said body of instructions in association with said first data entity;
    wherein creating the unmaterialized version of said second data entity does not comprise persistently storing a copy of said second data entity;
    wherein the unmaterialized version of said second data entity is a version for which there is no copy that is necessarily persistently stored, and wherein the unmaterialized version of said second data entity is associated with a delta representation that represents the delta between the unmaterialized version and another version;
    wherein the unmaterialized version of said second data entity incorporates the one or more changes through said body of instructions that represents the delta;
    wherein said body of instructions, when applied to said first data entity, generates the copy of the unmaterialized version of said second data entity.

2. The method of claim 1, wherein the first data entity and the second data entity are versions of a particular data entity.

3. The method of claim 1, wherein:
    the body of instructions includes a template that represents a difference between said first data entity and said second data entity, said template implemented to cause said second data entity to reflect said difference;

the steps further including determining matching criteria of a first node in a first node tree to which to apply said template, said first node representing an element in said first data entity; and wherein the step of generating includes generating said template in a way that causes said template to be applied to a node that matches said matching criteria.

4. The method of claim 3, wherein:

said template, when executed, causes insertion of second one or more nodes that correspond to one or more elements in said second data entity; and said template, when executed, causes the insertion of said first node into a second node tree that corresponds to said second data entity.

5. The method of claim 4, wherein said template, when executed, causes said second one or more nodes to be inserted as siblings or descendants of said particular node.

6. The method of claim 3, wherein:

said difference corresponds to an element deleted from said first data entity; and wherein said template specifies no instructions that cause modification or insertion of an element in the second data entity.

7. The method of claim 3, wherein the step of generating said template in a way that causes said template to be applied to a node that matches said matching criteria includes generating a matching attribute for said template.

8. A method of representing multiple versions of a data entity, comprising the computer-implemented steps of:

performing a determination of deltas between said multiple versions and the data entity;

for each delta of said deltas, generating based on said determination a body of instructions that conform to an extensible style language transformation language, and prescribe operations for transforming a previous version of said data entity into a subsequent version, wherein said body of instructions represents said each delta between said previous version and said subsequent version;

wherein each delta of said deltas reflects one or more changes that have been made to a previous version of said data entity to obtain a subsequent version of said data entity;

creating unmaterialized versions of said data entity, wherein creating the unmaterialized versions comprises persistently storing said bodies of instructions for said deltas in association with said data entity, and wherein creating the unmaterialized versions does not comprise storing copies of the unmaterialized versions of said data entity;

wherein creating the unmaterialized versions of said data entity does not comprise persistently storing said multiple versions of said data entity;

wherein each unmaterialized version of said unmaterialized versions incorporates the one or more changes through a corresponding body of instructions that represents a corresponding delta of said deltas;

wherein each of said bodies of instructions, when applied to said data entity, generates a copy of an unmaterialized version of said data entity.

9. A method for representing multiple versions of a data entity, comprising the computer-implemented steps of:

performing a determination of deltas between said multiple versions and the data entity;

means for generating for each delta of said deltas, based on said determination, a body of instructions that conform to an extensible style language transformation language, and prescribe operations for transforming a previous version of said data entity into a subsequent version, wherein said body of instructions represents said each delta between said previous version and said subsequent version;

wherein each delta of said deltas reflects one or more changes that have been made to a previous version of said data entity to obtain a subsequent version of said data entity;

creating unmaterialized versions of said data entity, wherein creating the unmaterialized versions comprises persistently storing said bodies of instructions for said deltas in association with said data entity, and wherein creating the unmaterialized versions does not comprise storing copies of the unmaterialized versions of said data entity;

wherein creating the unmaterialized versions of said data entity does not comprise persistently storing said multiple versions of said data entity;

wherein each unmaterialized version of said unmaterialized versions incorporates the one or more changes through a corresponding body of instructions that represents a corresponding delta of said deltas;

wherein each of said bodies of instructions, when applied to said data entity, generates a copy of an unmaterialized version of said data entity.

10. A computer-readable storage medium storing one or more sequences of instructions for representing versions of data entities, wherein execution of the one or more sequences of instructions by one or more processors causes the one or more processors to perform the steps of:

performing a determination of a delta between a first data entity that conforms to an extensible mark-up language and a second data entity that conforms to the extensible mark-up language;

generating based on said determination a body of instructions that prescribes operations for transforming said first data entity into said second data entity;

wherein said body of instructions represents the delta between said first data entity and said second data entity;

wherein the body of instructions conforms to an extensible style language transformation language;

wherein the delta reflects one or more changes that have been made to said first data entity to obtain said second data entity;

creating an unmaterialized version of said second data entity, wherein creating the unmaterialized version comprises persistently storing said body of instructions in association with said first data entity.

wherein creating the unmaterialized version of said second data entity does not comprise persistently storing a copy of said second data entity;

wherein the unmaterialized version of said second data entity is a version for which there is no copy that is necessarily persistently stored, and wherein the unmaterialized version of said second data entity is associated with a delta representation that represents the delta between the unmaterialized version and another version;

wherein the unmaterialized version of said second data entity incorporates the one or more changes through said body of instructions that represents the delta;

wherein said body of instructions, when applied to said first data entity, generates the copy of the unmaterialized version of said second data entity.

11. The computer-readable storage medium of claim 10, wherein the first data entity and the second data entity are versions of a particular data entity.

12. The computer-readable storage medium of claim 10, wherein:

the body of instructions includes a template that represents a difference between said first data entity and said second data entity, said template implemented to cause said second data entity to reflect said difference;

the steps further including determining matching criteria of a first node in a first node tree to which to apply said template, said first node representing an element in said first data entity; and wherein the step of generating includes generating said template in a way that causes said template to be applied to a node that matches said matching criteria.

13. The computer-readable storage medium of claim 12, wherein:

said template, when executed, causes insertion of second one or more nodes that correspond to one or more elements in said second data entity; and said template, when executed, causes the insertion of said first node into a second node tree that corresponds to said second data entity.

14. The computer-readable storage medium of claim 13, wherein said template, when executed, causes said second one or more nodes to be inserted as siblings or descendants of said particular node.

15. The computer-readable storage medium of claim 12, wherein:

said difference corresponds to an element deleted from said first data entity; and wherein said template specifies no instructions that cause modification or insertion of an element in the second data entity.

16. The computer-readable storage medium of claim 12, wherein the step of generating said template in a way that causes said template to be applied to a node that matches said matching criteria includes generating a matching attribute for said template.

17. A computer-readable storage medium storing one or more sequences of instructions for representing multiple versions of a data entity, wherein execution of the one or more sequences of instructions by one or more processors causes the one or more processors to perform the steps of:

performing a determination of deltas between said multiple versions and the data entity;

for each delta of said deltas, generating based on said determination a body of instructions that conform to an extensible style language transformation language, and prescribe operations for transforming a previous version of said data entity into a subsequent version, wherein said body of instructions represents said each delta between said previous version and said subsequent version;

wherein each delta of said deltas reflects one or more changes that have been made to a previous version of said data entity to obtain a subsequent version of said data entity;

creating unmaterialized versions of said data entity, wherein creating the unmaterialized versions comprises persistently storing said bodies of instructions for said deltas in association with said data entity, and wherein creating the unmaterialized versions does not comprise storing copies of the unmaterialized versions of said data entity;

wherein creating the unmaterialized versions of said data entity does not comprise persistently storing said multiple versions of said data entity;

wherein each unmaterialized version of said unmaterialized versions incorporates the one or more changes through a corresponding body of instructions that represents a corresponding delta of said deltas;

wherein each of said bodies of instructions, when applied to said data entity, generates a copy of an unmaterialized version of said data entity.

18. A computer-readable storage medium storing one or more sequences of instructions for representing multiple versions of a data entity, wherein execution of the one or more sequences of instructions by one or more processors causes the one or more processors to perform the steps of:

performing a determination of deltas between said multiple versions and the data entity;

means for generating for each delta of said deltas, based on said determination, a body of instructions that conform to an extensible style language transformation language, and prescribe operations for transforming a previous version of said data entity into a subsequent version, wherein said body of instructions represents said each delta between said previous version and said subsequent version;

wherein each delta of said deltas reflects one or more changes that have been made to a previous version of said data entity to obtain a subsequent version of said data entity;

creating unmaterialized versions of said data entity, wherein creating the unmaterialized versions comprises persistently storing said bodies of instructions for said deltas in association with said data entity, and wherein creating the unmaterialized versions does not comprise storing copies of the unmaterialized versions of said data entity;

wherein creating the unmaterialized versions of said data entity does not comprise persistently storing said multiple versions of said data entity;

wherein each unmaterialized version of said unmaterialized versions incorporates the one or more changes through a corresponding body of instructions that represents a corresponding delta of said deltas;

wherein each of said bodies of instructions, when applied to said data entity, generates a copy of an unmaterialized version of said data entity.

* * * * *

UNITED STATES PATENT AND TRADEMARK OFFICE
CERTIFICATE OF CORRECTION

| | | |
|---|---|---|
| PATENT NO. | : 7,437,662 B1 | Page 1 of 1 |
| APPLICATION NO. | : 10/173470 | |
| DATED | : October 14, 2008 | |
| INVENTOR(S) | : Yu et al. | |

It is certified that error appears in the above-identified patent and that said Letters Patent is hereby corrected as shown below:

On cover page, item (75), in "Inventors", line 1-2, delete "Megnha Mehta" and insert -- Meghna Mehta --, therefor.

In column 4, line 6, delete "/book/Authors/Author[]" and insert -- /book/Authors/Author[1] --, therefor.

In column 6, line 50-51, delete "/booklist[1]/book[]/title[1]" and insert -- /booklist[1]/book[1]/title[1] --, therefor.

In column 9, line 28, delete "computer readable" and insert -- computer-readable --, therefor.

In column 12, line 52, in claim 10, delete "." and insert -- ; --, therefor.

Signed and Sealed this

Thirteenth Day of April, 2010

David J. Kappos
*Director of the United States Patent and Trademark Office*